Oct. 31, 1967

D. E. BRIDGES 3,350,710

LIQUID LEVEL INDICATORS

Filed April 27, 1965

3,350,710
LIQUID LEVEL INDICATORS
Donald Edward Bridges, Leatherhead, Surrey, England, assignor to Dipstix Limited, Weybridge, England, a British company
Filed Apr. 27, 1965, Ser. No. 451,218
Claims priority, application Great Britain, Apr. 28, 1964, 17,611/64
7 Claims. (Cl. 340—410)

ABSTRACT OF THE DISCLOSURE

A fluid level indicator for sensing the presence or absence of a fluid at a predetermined level comprises a sensor formed of a resistance wire having an appreciable coefficient of resistance change with temperature, a lamp indicator and means for checking the operation of the lamp and sensor. In a preferred embodiment, the sensor has a positive coefficient of resistance change and is connected in series with a ballast resistor above the fluid and also with a positive coefficient of resistance change so that a lamp in parallel with the sensor will light as soon as the circuit is energized, the lamp remaining lit only if the sensor is above the fluid level.

---

This invention relates to liquid level indicators of the kind indicating the presence or absence of liquid at a predetermined position. The indicator of the present invention is for use with thermally conductive liquids and is applicable more particularly, although not exclusively, to checking the oil level in the sump of an internal combustion engine.

More generally, however, the apparatus of the present invention can be used to determine the presence or absence of any thermally conductive substance which can flow or be caused to flow so that a sensor, at the position where the presence or absence of the substance is to be detected, will be in contact with the thermally conductive substance if it is present at that level. The apparatus now specifically described in the present application can, for example, be used to detect the presence or absence of sand or cement, which can, if necessary, be caused to flow by blowing. In this specification references to a thermally conductive liquid are to be understood to mean any thermally conductive substance which can flow or can be caused to flow so that, if present, it will come in contact with a sensor.

According to one aspect of the invention, a liquid level indicator comprises a liquid sensor in the form of a length of wire carried on a support member for positioning the wire at a point where the presence or absence of liquid is to be indicated, which length of wire is connected in series with an electric current supply source, the wire being of a material having an appreciable coefficient of resistance change with temperature, and indicating means responsive to the magnitude of the resistance of said wire to indicate whether or not the wire is immersed in a thermally conductive liquid which conducts away the heat produced in said wire. Most conveniently the wire is connected in series with a resistance element having a resistance greater than that of said length of wire, and the indicating means is an indicating device responsive to the voltage developed across said wire.

The temperature of the wire and hence its electrical resistance will depend on whether or not it is immersed in the thermally conductive liquid and said means responsive to the voltage developed across the said wire can be arranged to indicate whether or not the resistance value corresponds to that of the wire immersed in the liquid.

The wire may be of material having a positive or a negative coefficient of resistance change with temperature. However, as will be apparent from the following description, to obtain a quick response, a very fine wire is preferably employed and it is most convenient to use a metal wire and, in practice, a nickel wire is particularly suitable. Nickel, like almost all other metals, at temperatures such as oil temperatures in internal combustion engines, has a positive temperature coefficient. In the following description, a positive temperature coefficient will be assumed although it will be readily apparent how the indicator may be used or modified if material, such as thermistor material, having a negative temperature coefficient is employed.

The aforementioned length of wire would normally be a short length of wire, conveniently arranged in a loop or coil since, as far as possible, the wire has to be located at the level at which the presence or absence of liquid has to be sensed.

In the simplest form, the wire is connected in series with the resistance element and the supply source but preferably a switch is provided in the circuit so that current is only consumed when the indicator is to be used. If the wire is immersed in a thermally conductive liquid, it will be kept relatively cool and hence will have a low resistance; if, however, it is out of the liquid, the heat developed by the passage of electric current will evaporate any liquid from the wire and the wire will then rise in temperature so that its resistance increases. The voltage developed across the wire therefore increases and this is indicated by said voltage responsive means. The voltage responsive means may comprise a lamp bulb connected in parallel with said wire; such a bulb will thus light when the sensor is out of the liquid.

Preferably the wire is in the form of a coil to minimise escape of heat. The voltage might typically rise to 2 volts when the wire is white hot and this voltage change may readily be indicated with a tungsten filament lamp bulb. Preferably the switch is a spring-loaded switch, e.g. a press-button switch which will normally be open to avoid drain on the supply source. A substantial amount of heat may be dissipated in the series resistance and preferably therefore this resistance comprises a wire wound on an element of substantial thermal mass.

More generally speaking, the change in voltage developed across the wire may be sensed by measuring the voltage in parallel with the wire or in parallel with the series resistor but the change in voltage drop through the wire is proportionally greater than the change across the series resistor. Hence preferably the voltage responsive means are connected in shunt across the wire.

When an electric lamp bulb is used as an indicator, it is desirable to be able to check that the lamp bulb is operating correctly. With the simple form of indicator described above, it is readily possible to lift the sensor out of the liquid. If the switch is then operated, the lamp bulb will light and this provides a check on the operation of the apparatus. It will be noted however that there is no need to wipe the sensor like a conventional dipstick and the operation is therefore much simpler and cleaner. It is possible however to avoid any necessity of lifting the sensor by providing a second switch arranged to reduce the series resistance so that the lamp will light (or other voltage responsive means operate) when the sensor is in the liquid. With this arrangement, the first mentioned switch is operated; if the lamp lights the sensor is above the liquid level, if it does not light, the second switch is operated to check that the lamp and power source are operating correctly and so to confirm that the failure of the lamp to light on operation of the first switch indicates that the sensor is immersed in the liquid.

However a check on the operation of the lamp bulb can be provided without requiring any second switch. This may be done by making the aforesaid resistance element in series with the wire of a material having an appreciable coefficient of resistance change with temperature, which coefficient is of the same sign as that of the said length of wire, that is to say both are positive, and making the said resistance element of sufficient heat capacity such that it will take time to reach its normal operating temperature when the current is switched on; the supply voltage and the magnitude of the resistance of said resistance element are proportioned so that the lamp will light when the equipment is first switched on until such time as said resistance element has warmed up to its normal operating temperature. Thus the initial switching on of the equipment with the consequent momentary lighting of the lamp bulb provides a positive check of the correct operation of the lamp. The operator thus merely has to switch on the equipment and will see that the lamp lights. This shows the equipment is operating properly. If the lamp then goes out the liquid level is above the level of the sensing element but if the lamp remains lit, then the liquid level is below the level of the sensor. Very conveniently in this arrangement the sensing element and the resistance element are made of similar material.

For use for measuring the oil level in the sump of an internal combustion engine, the sensor may be mounted on a rod or the like for fitting in place of the conventional type of dipstick. Preferably the sensor, for protection, is mounted within a tube having a suitable aperture or apertures to permit the liquid to reach the sensor. To check the oil level, in the simplest arrangement described above, the sensor is lifted out of the oil and the current switched on; this heats the wire to evaporate any oil on it and the lamp lights. On putting the sensor back, the light will go off if the sensor is put in the oil as the temperature of the wire immediately falls and so the resistance decreases. If the light remains on, the oil level is below the position of the sensor. As explained above this initial removal of the device is to check that it is operating correctly and the requirement to remove the device is obviated either by providing a second switch arranged to reduce the series resistance or by constructing the series resistance of material with the appropriate temperature coefficient and thermal capacity as described above.

In order that the device should not be affected by any variations in the temperature of the liquid to be sensed, the current through the wire may be made sufficient to raise the temperature, when the wire is out of the liquid, to a value far in excess of any temperature of the liquid and conveniently, for an oil level indicator, a nickel wire may be used with a current sufficient to make the wire white hot. The wire is preferably very short and very fine to ensure that little oil clings to it and such oil is rapidly evaporated when this current is passed through the wire. In a typical construction for operation from a 12 volt supply source, the wire has a resistance of about ½ ohm when cold and the series resistance is proportional to give a voltage drop across the wire of about ½ volt when the wire is cold.

An arrangement employing two switches or employing a resistance element with a suitable temperature coefficient as described above may readily be fitted on a car with the lamp and the switch or switches on the dashboard so that the oil level may be checked without having to open the bonnet to obtain access to the engine.

For a remote indicating system, it may be convenient to use a transistor amplifier with the sensor current passing through said series resistance and a first switch and to arrange said second switch to connect a further resistance in parallel with said series resistance to increase the current through the sensor. To indicate the voltage across the sensor, a transistor may be connected in shunt with said sensor resistance and first switch with a potentiometer biasing circuit for the base of the transistor so that the current passed by the transistor is dependent on the voltage across the sensor. This current can then be used to control a second transistor which is in series with a lamp bulb constituting the indicator.

Figure 1:
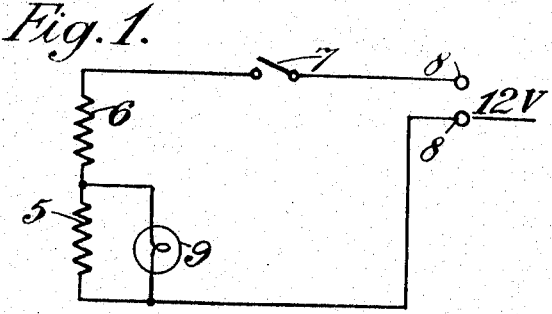
FIGURE 1 shows a first embodiment of the invention.

Referring to FIGURE 1, there is provided a sensing element 5 which in this particular embodiment comprises a one inch length of 40 s.w.g. nickel wire. This element is mounted on a rod or tube or the like for fitting in place of the conventional type of dipstick used in an internal combustion engine and provision may be made for mechanically adjusting the position of this sensing element on the rod. Conveniently this is done by providing a threaded adjusting element with a suitable locknut. The user can thus set the sensor at the appropriate level at which he wishes to be able to obtain indication of the presence or absence of oil in the sump. Generally the level will be set at a point such that if the oil level is below the sensor, then additional oil has to be put into the engine.

Conveniently the nickel wire is in the form of a loop or small coil the ends being soldered to two insulated copper wires which conveniently pass upwardly through a tube, for instance a resin impregnated glass fibre tube, forming the support for the sensing element. Referring again to FIGURE 1, the sensing element 5 is connected in series with a ballast resistor 6 which in this particular embodiment is an 8 ohm resistance. The elements 5 and 6 are connected in series and fed, via a switch 7, from the supply terminals 8 of a 12 volt supply, typically the battery of the vehicle. Connected in shunt across the element 5 is a 2.5 volt 0.3 ampere tungsten filament lamp 9 which forms an indicator and which is located at some suitable point, e.g. on the dashboard of the vehicle, where it is readily visible. Conveniently the switch 7, ballast resistor 6 and lamp 9 are arranged in a single unit which can be connected by leads to the supply terminals 8 and the sensor element 5.

With the arrangement thus above described, when the sensor element 5 is immersed in oil its temperature cannot rise very much when current is passed through it and hence its resistance will remain quite low when the switch 7 is closed. As a result the voltage drop across it is not sufficient to cause the lamp 9 to light. If however the element 5 is out of the oil, when current is passed through it, any residual oil adhering to the element will soon evaporate and the temperature of the element will rise. As a result of the rise in temperature its resistance will increase and hence the potential across it will increase.

This causes the lamp 9 to light. Thus on closing the switch 7, the lamp 9 will light only if the sensor element 5 is above the level of the oil in the sump. Checking of the operation of the lamp 9 can readily be effected by lifting the dipstick unit to raise the sensor element 5 out of the oil and then pressing switch 7 which will then cause the lamp to light.

Very conveniently however the ballast resistor 6 is made of similar wire to the sensing element 5 having an appreciable temperature coefficient of resistance change. Such a ballast resistor also has an appreciable thermal capacity and, by suitably proportioning the magnitudes of the elements 5 and 6, the lamp 9 can be caused to light when the switch 7 is first closed but subsequently to go out if the element 6 heats up to achieve a much higher resistance whilst the element 5 remains cooled by being immersed in the oil. By constructing the ballast resistor 6 in this way, it becomes possible to check the operation of the lamp 9 by noting whether it comes on immediately the switch is pressed. This avoids any necessity to lift the dipstick.

Figure 2:
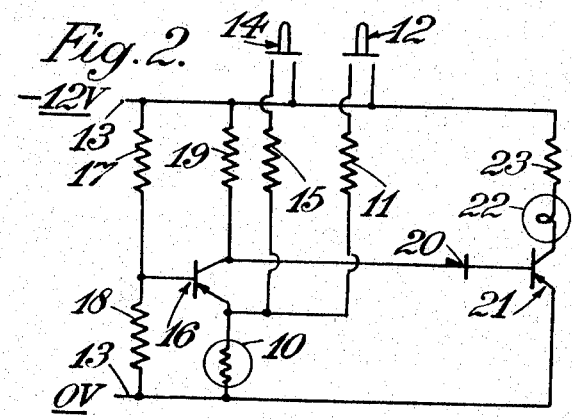
FIGURE 2 shows a second embodiment of the invention.

Another circuit arrangement more particularly suitable for a remote indicating system is illustrated in FIGURE 2 of the drawings. In this figure the sensor is indicated at 10 and is constructed of a coil or loop of 40 s.w.g. nickel wire as in the previously described construction. Typically the sensor has a resistance, when cold, of half an ohm. This sensor, in series with a 10 ohm resistance 11, is connected, by means of a first switch 12, across a 12 volt supply source indicated by supply leads 13. A second switch 14 connects a further 10 ohm resistor 15 in shunt across the resistor 11 when both switches are operated together for passing an increased current through the sensor 10. A first transistor 16 has its base connected to a tap on a potentiometer network constituted by resistors 17, 18, of 100K ohms and 500 ohms respectively, across the supply source 13. The emitter of this transistor is connected to the junction of sensor 10 and resistor 11 whilst the collector is connected to the 12 volt supply source through a load resistor 19 of 5K ohms. The output voltage developed across this load resistor is fed through a five volt Zener diode 20 to the base of a second transistor 21 having a 6 volt 0.06 ampere lamp bulb 22 and a resistor 23 of 100 ohms connected in series in the collector circuit. The switches 12, 14 are preferably spring-loaded press-button switches.

The arrangement illustrated is used as an oil level indicator for a car in the following way. After switching off the engine and allowing the oil to settle, switch 12 is pressed. If the oil is below the sensor, the latter will heat up and its resistance will increase substantially. This will cut-off transistor 16 and so will make transistor 21 conductive. The lamp 22 will thus light. If, however, the oil level is above the sensor, the transistor 16 will be conductive and so transistor 21 will be cut-off and the lamp will not light. In this case an immediate check of any possible failure of the bulb 22 or of the current supply may be made by pressing switch 14 whilst still holding switch 12 depressed. This will pass additional current through the sensor and this current is sufficient that the voltage across the sensor will rise even though immersed in oil and so will cause the lamp to light. It will be noted that failure of any of the circuit components will prevent the lamp lighting when the two switches are pressed concurrently and that the circuit cannot give a false indication of the presence of oil at the level of the sensor. The use of a potentiometer network across the supply for biasing the transistor 16, so that the sensor is effectively in a bridge circuit, gives compensation for any voltage changes in the supply source. In practice the circuit can readily be made to respond to changes of 20 millivolts across the sensor.

Figure 3:
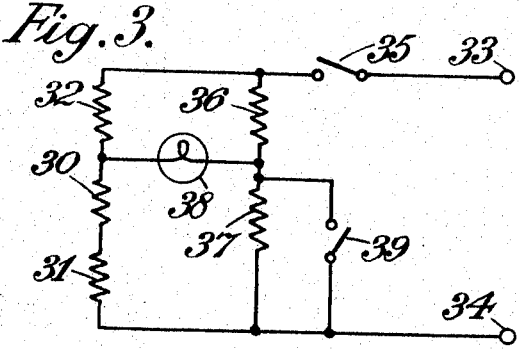
FIGURE 3 shows a third embodiment of the invention.

Yet another circuit arrangement is illustrated in FIGURE 3. Referring to that figure there is shown a sensing element 30 which is constructed of a one inch length of 40 s.w.g. nickel wire. The element is connected in a bridge circuit. One arm of the bridge comprises the element 30 in series with a 0.25 ohm resistor 31. An adjacent arm of the bridge comprises a ballast resistor 32 which is typically of 8 ohms. These two arms in series are connected across 12 volt supply terminals 33, 34, a first switch 35 being provided for completing the supply circuit. The supply terminals 33, 34 may be the terminals of a battery of the vehicle. The two remaining arms of the bridge comprise an 8 ohm resistor 36 and a 0.5 ohm resistor 37. A 2.5 volt 0.3 ampere tungsten filament lamp 38 is connected across a diagonal of the bridge and a second switch 39 is provided for short circuiting the resistor 37. The element 30 when cooled by immersion in oil or other thermally conductive liquid has a resistance such that the bridge is substantially balanced. If the element 30 however is out of the liquid, its temperature will rise when the switch 35 is closed and hence its resistance will increase so unbalancing the bridge and causing the lamp 38 to light. The second switch 39 is provided for the purpose of deliberately unbalancing the bridge in order to check the operation of the lamp when required. The arrangement of FIGURE 3 is employed by firstly closing the switch 35. If the element 30 is immersed in the oil, the lamp 38 will not light but it will light if the element 30 is out of the oil. If the lamp does not light closing of the switch 39 will cause the lamp to light and will confirm that the system is operative. It will again be noted that failure of any of the circuit components will prevent the lamp lighting when the two switches are pressed together and that the circuit cannot give a false indication of the presence of oil at the level of the sensor.

Although the liquid level indicator has been described more particularly with reference to determining the oil level in the sump of an internal combustion engine, it can be used with any other thermally conductive liquid. In particular, on a motor vehicle, it might be used to monitor a number of separate liquid levels by providing a selector switch for connecting a number of different sensors into the circuit. For example the water level in the radiator cooling system could be monitored or the oil level for example in the back axle or gear box or the hydraulic fluid level in hydraulic reservoirs. As previously explained, the device may be used more generally for detecting the presence or absence of any thermally conductive substance which can flow or can be caused to flow and it has been found, for example, that the particular embodiments described above can be used to sense the level of sand or cement in a hopper or other container.

I claim:

1. A liquid level indicator comprising a support member carrying a length of wire and arranged for positioning the wire at a point where the presence of liquid is to be indicated, an electric current supply source, an electrical resistance element having a resistance greater than that of said length of wire and connected in a series circuit with said supply source and said length of wire, an indicator lamp connected in shunt across said length of wire, the wire being of a material having an appreciable coefficient of resistance change with temperature of positive sign and a resitsance of magnitude such that the voltage across the resistance element is sufficient to light the lamp when the wire is not cooled by immersion in a thermally conductive liquid but is not sufficient to light the lamp when the wire is immersed in the thermally conductive liquid, and means operable to cause additional current to flow through said length of wire and thereby to cause the lamp to light even if said length of wire is immersed in the liquid.

2. A liquid level indicator for sensing the presence or absence of a thermally conductive liquid comprising a sensing element in the form of an electrical resistance wire having a positive coefficient of resistance change with temperature, a ballast resistor connected in series with said sensing element, a voltage supply source, means, including a switch, for applying voltage from said supply source to the series-connected sensing element and ballast resistor, and an indicator lamp connected in shunt across said sensing element which lamp has an impedance large compared with that of the sensing element, the applied voltage being of a magnitude such that the current through the sensing element, if the latter is out of the liquid, will raise the temperature of the sensing element substantially above the boiling point of the liquid, and the ballast resistor having a resistance proportioned so that the lamp will light when the sensing element is heated, by the passage of current, to said temperature above the boiling point of the liquid but not if the sensing element is immersed in said thermally conductive liquid, said ballast resistor having a positive coefficient of resistance change with temperature and having a resistance of sufficiently small magnitude when cold that the lamp will light, the thermal time constant of the ballast resistor being short so that the lamp will light only momentarily when the sensing element is immersed in said liquid.

3. Apparatus for sensing the presence or absence of oil at a given position in the sump of an internal combustion engine, comprising a coil of nickel wire located at said position, a ballast resistor connected electrically in series with said coil of wire, a source of electric power supply, a spring-loaded push-button switch arranged, when depressed, to apply a voltage from said power supply source to said ballast resistor and coil in series, and an indicator lamp connected in shunt across said coil, said coil being constructed of wire having a resistance such that, when out of the oil, the coil will heat to a temperature above the boiling point of the oil and the lamp being arranged to light when the voltage applied to it is the voltage across the coil when the latter is at said temperature above the boiling point of the oil, and the ballast resistor having a magnitude such that, when the coil is immersed in the oil and is cooled thereby, so having a lower resistance than when it is hot, the voltage across the coil is insufficient to light the lamp and wherein circuit means, including a second push-button switch, are provided operative when said second switch is depressed to apply a voltage to said indicator lamp sufficient to light the lamp when the coil is immersed in the oil.

4. Apparatus for sensing the presence or absence of oil at a given position in the sump of an internal combustion engine, comprising a coil of nickel wire located at said position, a ballast resistor connected electrically in series with said coil of wire, a source of electric power supply, a spring-loaded push-button switch arranged, when depressed, to apply a voltage from said power supply source to said ballast resistor and coil in series, and an indicator lamp connected in shunt across said coil, said coil being constructed of wire having a resistance such that, when out of the oil, the coil will heat to a temperature above the boiling point of the oil and the lamp being arranged to light when the voltage applied to it is the voltage across the coil when the latter is at said temperature above the boiling point of the oil, and the ballast resistor having a magnitude such that, when the coil is immersed in the oil and is cooled thereby, so having a lower resistance than when it is hot, the voltage across the coil is insufficient to light the lamp, the ballast resistor furhter having a short thermal time constant and a positive coefficient of resistance change with temperature such that, when the push-button is operated, the lamp lights momentarily before the ballast resistor becomes hot.

5. A level indicator for indicating the level of a flowable material comprising a length of wire for positioning at a location where the presence or absence of material is to be sensed, at least one electrical resistance connected in series with said length of wire, a current supply source for energizing the series circuit, said wire being of a material having an appreciable coefficient of resistance change with temperature, an indicator connected across part of said series circuit to give an indication when the length of wire is not immersed in a material which conducts away the heat produced in said wire and means operable to modify the voltage distribution in said series circuit to make extra current flow through said length of wire and thereby to cause the indicator to give an indication even if the length of wire is immersed in said material.

6. A level indicator as claimed in claim 5 wherein said means operable to modify the voltage distribution in said circuit comprises a further resistor and manually operable switch means arranged to connect said further resistor in shunt across part of said series circuit.

7. A level indicator for sensing the presence or absence of a material at a predetermined position, which indicator comprises a length of wire having a positive temperature coefficient at said predetermined position, a ballast resistor connected in series with said length of wire and also having a positive temperature coefficient, a power supply source, a manually operable switch for connecting said power supply source to energize the series circuit including the length of wire and ballast resistor, and an indicator lamp in shunt across said length of wire, the ballast resistor having a resistance of sufficiently small magnitude when cold that the lamp will light but, when heated by the passage of current, having a resistance so proportioned to that of said length of wire that the lamp will not light if heat is conducted away from the length of wire by said material and will light if the length of wire is not immersed in said material.

References Cited
UNITED STATES PATENTS

| | | | |
|---|---|---|---|
| 1,823,397 | 9/1931 | Guy | 73—295 |
| 2,715,717 | 8/1955 | Keithley et al. | 73—1 |
| 2,769,121 | 10/1956 | Rogoff. | |
| 3,068,459 | 12/1962 | Kreissler et al. | |

FOREIGN PATENTS 513,358   2/1955   Italy.

LOUIS R. PRINCE, *Primary Examiner.*

S. CLEMENT SWISHER, *Assistant Examiner.*